United States Patent [19]

Utsunomiya et al.

[11] Patent Number: 4,963,999
[45] Date of Patent: Oct. 16, 1990

[54] TAPE POSITION DETECTION APPARATUS HAVING START CONTROL AND INITIAL TAPE POSITION RECOVERY

[75] Inventors: Masaaki Utsunomiya, Yokohama; Fumio Izawa, Sagamihara, both of Japan

[73] Assignee: Kabushiki Kaisha Toshiba, Kawasaki, Japan

[21] Appl. No.: 158,684

[22] Filed: Feb. 22, 1988

[30] Foreign Application Priority Data

Feb. 23, 1987 [JP] Japan .................................. 62-39588

[51] Int. Cl.$^5$ ...................... G11B 27/10; G11B 27/34; G11B 15/18
[52] U.S. Cl. .................................. 360/72.3; 360/74.2; 360/137
[58] Field of Search .................... 360/72.3, 72.1, 74.2, 360/137

[56] References Cited

U.S. PATENT DOCUMENTS

| | | | |
|---|---|---|---|
| 4,172,231 | 10/1979 | de Costemored'arc et al. .... | 360/72.3 |
| 4,280,159 | 7/1981 | Nakayama ........................... | 360/137 |
| 4,347,538 | 8/1982 | Klank .................................. | 360/137 |
| 4,644,436 | 2/1987 | Unno .............................. | 360/72.3 X |
| 4,805,053 | 2/1989 | Yamanaka et al. ................ | 360/72.3 |

FOREIGN PATENT DOCUMENTS 55-45161  3/1980  Japan ................................. 360/72.3

Primary Examiner—John H. Wolff
Attorney, Agent, or Firm—Cushman, Darby & Cushman

[57] ABSTRACT

A tape position detection apparatus is disclosed wherein a tape is first fed in a forward direction from one reel to another for a predetermined period of time, under the control of a tape transit control circuit. When the reels rotate, respective pulse generators generate pulses which are counted by corresponding reel counters. The counting periods are set by control circuits, and upon completion of a counting period, the count obtained is stored as first count data in a memory circuit. Also, as a capstan for feeding the tape rotates, a corresponding pulse generator generates pulses which are counted by capstan counters. In accordance with the count, an operational circuit calculates the residual amount of tape for presentation on a display. In the meantime, upon completion of the first counting period described above, the tape is fed in the reverse direction by a logic control circuit, during which time the count obtained when the tape was fed in the forward direction is compared, in a comparison circuit, with the count obtained when the tape is fed in the reverse direction. When the count data being compared become substantially equal, the tape is stopped.

21 Claims, 3 Drawing Sheets

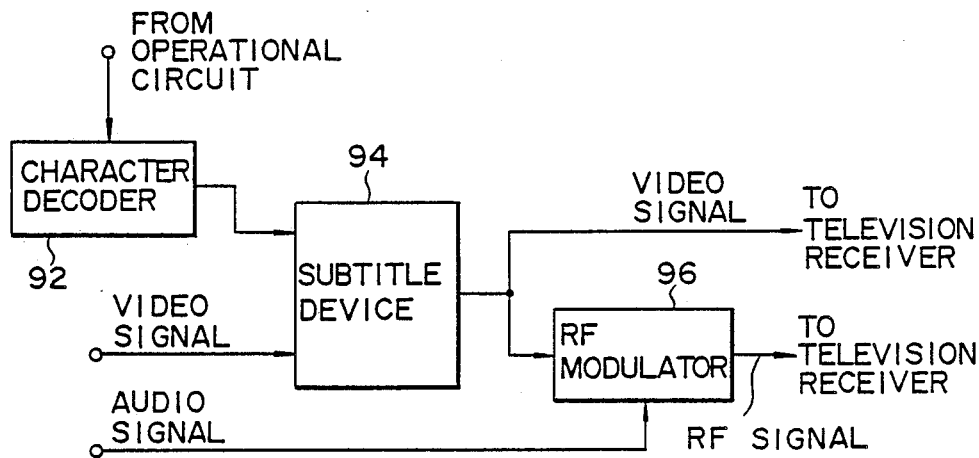
F I G. 3
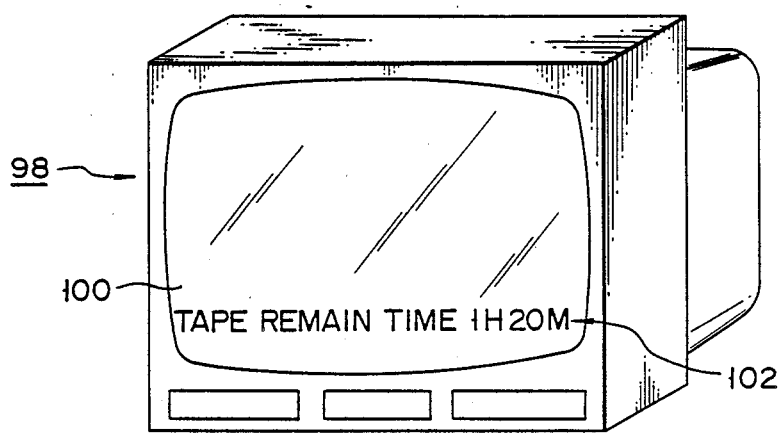
F I G. 4

TAPE POSITION DETECTION APPARATUS HAVING START CONTROL AND INITIAL TAPE POSITION RECOVERY

BACKGROUND OF THE INVENTION

1. Field of the Invention

This invention relates to a tape position detection apparatus and, more particularly, to a tape position detection apparatus for detecting the position of a tape or a film wound on reels in a video or audio tape recorder.

2. Description of the related art

The conventional video tape recorder uses a tape position detector to confirm the running position of the loaded tape. In order for the tape position to be detected by such an apparatus, the tape is first run for a predetermined period of time. Data relating to the speed or frequency of rotation of at least the reels, on which the tape is wound, is obtained by the detector, and is substituted in a predetermined equation for calculation. Thus, in the case of the above video tape recorder, the tape position cannot be calculated unless reproduction, a fast feed, or a rewind operation is first carried out immediately after the cassette tape has been loaded therein.

The rotation of the reels, however, is considerably unstable in case when the reels are not rotated by more than one rotation due to the excentricity of the reels and the state, in which the tape is wound on the reels. In order to determine the tape position with accuracy, therefore, it is necessary to wait at least until the reels complete one rotation. This means that in case of a reproduction mode, particularly of a tape where data is recorded in a long time mode, a considerable time is required until the display of the tape position is obtained.

Actual tape position display in a VHS format video tape recorder requires time as follows. With a cassette tape loaded in the video tape recorder, a time from the instant of start of tape loading caused by depressing a reproduction key till the instant when the tape position display is obtained, is measured. The measured time is approximately 15 seconds with a tape where data is recorded in a standard mode and approximately 30 seconds with a tape where data is recorded in a long time mode.

When the forward/reverse high speed reproduction mode, which is also known as the fast forward/reverse reproduction mode is employed in order to determine the tape position, the tape position can be displayed sooner than in the case where the normal reproduction mode is used. This is because in the fast forward/reverse reproduction mode, the tape is fed about five times faster than in the case of the normal reproduction mode. However, the tape is fed up to a position, which is considerably spaced apart from the position before the start of fast forward/reverse reproduction, and it has to be returned, manually, to the initial position, which is a time-consuming operation.

As has been shown, detecting the tape position by means of the prior art tape position detection apparatus is a relatively lengthy process and requires returning the tape to its original position prior to the commencement of the position detection operation. Moreover, it cannot be guaranteed that the tape will be returned to its exact pre-detection position. As a result, it has, until now, not been possible to satisfy the demand of being able to confirm the tape position or residual tape amount immediately, after the loading of the cassette tape into a recorder.

SUMMARY OF THE INVENTION

Accordingly, it is an object of the present invention to provide a tape position detection apparatus, which can quickly meet the demand of being able to confirm the tape position, and in which the tape having been fed for the detection of the tape position can be readily returned to the initial position.

According to the invention, there is provided a tape position detection apparatus having start control function, which comprises tape drive means for feeding a tape wound on reels in either one of first and second directions for forward or reverse feed for a predetermined period of time, means for controlling the feed of the tape driven by the tape drive means, tape-returning means for feeding the tape feed-controlled by the control means in a third or fourth direction, opposite to the first or second direction to return the tape to its position before it being fed in the first or second direction, detecting means for detecting data related to the tape feed, means for calculating the used or residual amount of the tape, based on the data detected by the detecting means, and display means for displaying the used or residual amount of the tape calculated by the calculating means.

According to another aspect of the invention, there is provided a tape position detection apparatus with start control function, which comprises first feeding means for feeding a tape in a first or second direction from one reel to another reel, first and second detecting means for detecting the rotation of the respective reels and generating corresponding pulses, first and second reel rotation counting means for counting the pulses supplied from the respective first and second detecting means, first and second control means for setting counting periods of the respective first and second reel rotation counting means, memory means for temporarily storing the outputs of the first and second reel rotation counting means as a first count after the lapse of the counting periods, a capstan for feeding the tape urged against it in reproducing and recording modes, third detecting means for detecting the rotation of the capstan and generating corresponding pulses, third counting means for counting the pulses provided by the third detecting means, means for calculating the tape position or the used or residual amount of the tape, based on the output of the third calculating means, means for displaying the tape position or the used or residual amount of the tape of calculation of the tape position by the calculating means, control means for stopping the tape after the lapse of the counting period, second feeding means for feeding the tape having been stopped by the control means in a third or fourth direction, opposite to the first or second direction, comparing means for comparing a second count provided by the reel rotation counting means and the first count stored in the memory means while the tape is being fed in the second direction by the second feeding means, and means for stopping the tape when the first and second counts being compared in the comparing means become substantially equal.

BRIEF DESCRIPTION OF THE DRAWINGS

These and other features of the present invention will become more apparent from the following detailed description of exemplary embodiment thereof, as illustrated in the accompanying drawings, in which:

FIG. 3 is a block diagram showing part of a video tape recorder of the type, in which the residual amount of tape is displayed by a subtitle device on a display as shown in FIG. 2; and FIG. 4 is a perspective view showing a television receiver, in which the residual tape amount is displayed by the subtitle device shown in FIG. 3.

DETAILED DESCRIPTION OF THE PREFERRED EMBODIMENT

An embodiment of the present invention will now be described, with reference to the drawings.

Figure 1:
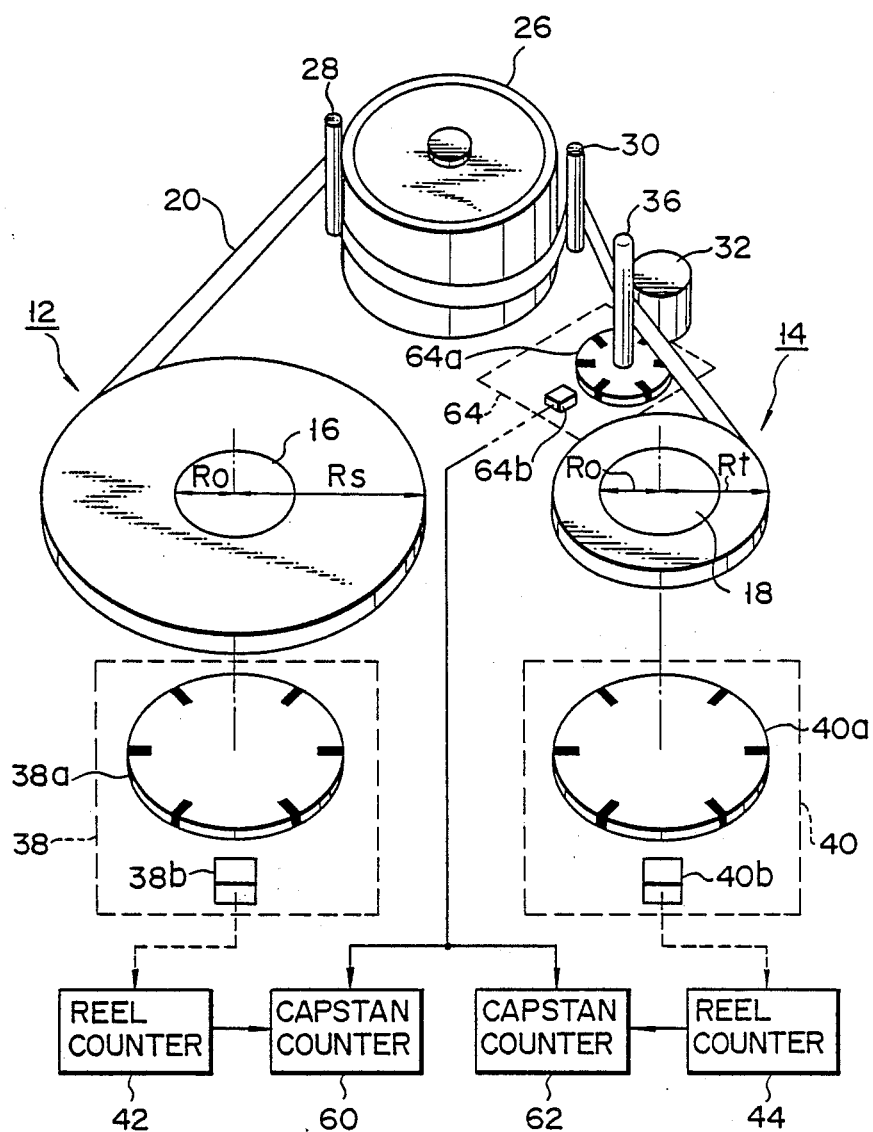
FIG. 1 is a schematic representation of a video tape recorder tape running system incorporating a tape position detection apparatus according to the invention.
Figure 2:
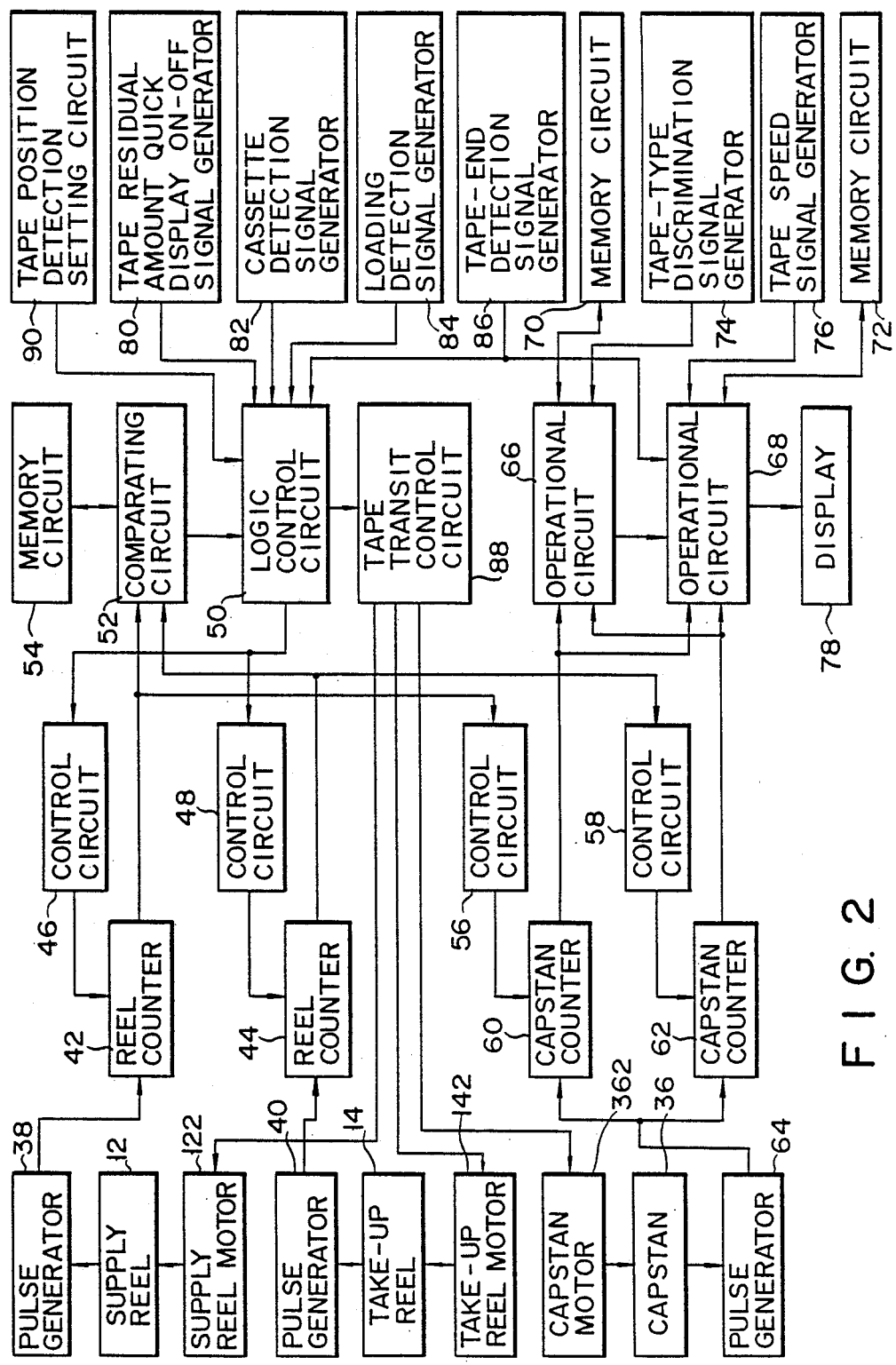
FIG. 2 is a block diagram showing the construction of the tape position detection apparatus according to the invention.

FIG. 1 shows a tape running system of a video tape recorder incorporating one embodiment of the tape position detector according to the invention. Supply reel 12 and take-up reel 14 are housed in a video tape cassette (not shown). Tape 20 is wound on hubs 16 and 18 of reels 12 and 14. When the cassette tape is inserted in the video tape recorder, reels 12 and 14 engage with corresponding reel bases (not shown). Tape 20 is fed from one reel to the other as reel bases are rotated in a predetermined direction by either supply reel drive motor 122 or take-up reel drive motor 142.

When the video tape recorder is in either the recording mode or the reproducing mode, tape 20 is passed round cylinder 26 having rotary heads. This is effected by predetermined operations of tape guides 28 and 30. The feeding of the tape begins when tape 20 is urged against capstan 36 by the pinch roller 32, and capstan 36 is then rotated by capstan drive motor 362.

Pulse generator 38 comprises a rotary disk 38a and a magnetic sensor 38b, pulse generator 40 comprises a rotary disk 40a and a magnetic sensor 40b. Either rotary disk has a plurality of magnets (six magnets in this embodiment) on its circumference. Generators 38 and 40 generate respective supply reel 12 and take-up reel 14 rotation detection pulses, which are supplied to respective reel counters 42 and 44.

The counting period and timing of reel counters 42 and 44 are controlled by control circuits 46 and 48, respectively which operate in accordance with control signals supplied by logic control circuit 50, which controls the video tape recorder tape running system. The outputs of reel counters 42 and 44 are supplied through comparating circuit 52 to memory circuit 54. The outputs supplied to memory circuit 54 are used as memory data or comparison data. The outputs of reel counters 42 and 44 are supplied to respective control circuits 56 and 58, which control the counting operation of capstan counters 60 and 62 during a period corresponding to a predetermined value of the input count. Pulse generator 64 produces a rotation detection pulse representing the rotation of capstan motor 362 which drives capstan 36 in order to feed tape 20. The output of pulse generator 64 is supplied to capstan rotation counters 60 and 62. Pulse generator 64 has the same structure as pulse generators 38 and 40, i.e., it comprises a rotary disk 64a and a magnetic sensor 64b.

The count outputs of capstan counters 60 and 62 are supplied to respective operational circuits 66 and 68. These count outputs are utilized in operational circuits 66 and 68 as data for determining the type of tape being used and residual tape amount, and are also supplied to memory circuits 70 and 72. For the calculation of the residual amount of tape, it is necessary to change parameters depending on the kind of tape. Tape-type discrimination signal generator 74 is coupled to operational circuit 66, discriminates the type of tape being used. Operational circuit 68 is coupled to tape speed signal generator 76 which generates, to find a residual tape amount, the identification of a class into which the current tape speed is classified. (If recording or reproduction is performed in SP mode, for instance, the tape speed signal generator identifies the current tape speed mode as an SP mode.) Display 78 for displaying the residual amount of tape is coupled to operational circuit 68.

For the control of the tape-running system, the output signals from tape residual amount quick display on-off signal generator 80, cassette detection signal generator 82, loading detection signal generator 84 and tape-end detection signal generator 86 are supplied to logic control circuit 50. Tape residual amount quick display on-off signal generator 80 produces an on-off signal concerning the display (quick display) of the residual amount of tape in an interlocked relation to the loading of the cassette tape to be described later. It is not always necessary to effect display of the residual amount of tape at the time of the loading of the cassette tape. Therefore, whether or not to effect the display is determined by the user. The output of signal generator 80 is supplied to logic control circuit 50.

Cassette detection signal generator 82 produces a signal as to whether there is a cassette loaded in the video tape recorder. Therefore, when the signal generator 82 does not supply any cassette detection signal to logic control circuit 50, no drive motor is operated, that is, neither reproducing nor recording operation as the tape running system is caused.

Loading detection signal generator 84 produces a signal as to whether the tape is loaded when the tape cassette is loaded in the video tape recorder. When the detection signal of signal generator 84 is supplied to logic control circuit 50, the system is rendered to be in a residual tape amount calculation mode.

Tape-end detection signal generator 86 produces a detection signal when tape 20 has been completely wound on a reel (i.e., either supply or take-up reel) in the reproducing, recording, fast forward or rewind operation. It is also coupled to operation circuit 68.

Logic control circuit 50 controls the tape-running system as follows according to the input data as noted above and also to prevailing state of control of the system. The prevailing state may be the rewind of tape 20, stationary state, reproducing state, etc. The control noted above is under-taken by tape transit control circuit 88, which is coupled to logic control circuit 50. To logic control circuit 50 is further supplied a mode-setting signal from a tape position detection setting circuit 90, which sets various modes, e.g., reproduction of tape 20, take-up, stop, for the tape position detection.

Now, an example of the operation of the video tape recorder having the above construction will be described.

When a cassette tape is loaded in the video tape recorder, logic control circuit 50 first effects loading of the cassette tape. Then, tape position detection setting circuit 90 supplies a setting signal to logic control circuit 50 to specify a fast forward reproduction mode of the tape-running system for the tape position detection.

Logic control circuit 50 then controls the tape-running system to be in the fast forward reproduction mode by having tape 20 to be urged against capstan 36 by pinch roller 32. At the same time, it causes reel counters 42 and 44 having been preset to be set in a measuring mode via control circuits 46 and 48. Thus, pulse generators 38 and 40 for detecting the rotation of respective supply and take-up reels 12 and 14, produce pulses with the rotation of the supply and take-up reels, these pulses being supplied to reel counters 42 and 44. While supply and take-up reels 12 and 14 execute one rotation, pulses produced from pulse generator 64 for detecting the rotation of the capstan 36 are supplied to capstan counters 60 and 62 for counting. At the same time, the counts of reel counters 42 and 44 at the time of the fast forward reproduction noted above are supplied through comparating circuit 52 to memory circuit 54 to be stored in the same.

Thus, the contents of the data in capstan counter 60 correspond to the extent of tape feed while supply reel 12 executes one rotation. Likewise, the contents of the data in capstan counter 62 correspond to the extent of tape feed while take-up reel 14 executes one rotation.

The data of capstan counters 60 and 62 are supplied to operational circuit 66. Operational circuit 66 discriminates the type of tape (i.e., time based on tape length) utilizing the output signal of tape-type discrimination signal generator 74. The data indicating the type of tape is supplied from operational circuit 66 to operational circuit 68, and tape speed signal generator 76 supplies to operational circuit 68 a speed mode signal for calculating the residual tape amount. Operational circuit 68 is further supplied with the count data from counters 60 and 62. All of the data thus supplied to operational circuit 68 is used for the calculation of the residual tape amount. At the same time, the mode of the tape-running system is switched over to a rewind mode by tape transit control circuit 88.

In the rewind mode, tape 20 is rewound until the count of reel counters 42 and 44 becomes equal to the count obtained at the time of the fast feed reproduction or a value obtained by adding a predetermined correction value to the count at the time of the fast feed reproduction. The count data of reel counters 42 and 44 at the time of the fast forward reproduction have been stored in memory circuit 54, and data at the time of the fast forward and that at the time of the rewind are compared in comparating circuit 52. The output of comparating circuit 52, representing the result of comparison of counts, is supplied as detection signal to logic control circuit 50. Then, tape transit control circuit 88 controls the tape-running system to a stop mode to stop motors 122, 142 and 362.

Now, the method of calculation of the residual amount of tape, will be described.

For the calculation, the type of tape is first discriminated by obtaining the radius Rs and Rt of the tape rolls on supply and take-up reels 12 and 14.

The tape roll radius Rs is given as follows:

$$Rs = \frac{\text{Radius of capstan}}{(\text{Number of capstan } FG \text{ pulses per rotation of capstan})} \times \frac{(\text{Number of capstan } FG \text{ pulses per rotation of supply real})}{} \quad (1)$$

The tape roll radius Rt, like Rs, can be obtained in the same manner as equation (1).

Then, there holds the following relation:

$$Rs^2 + Rt^2 = \frac{L \cdot t}{\pi} + 2Ro^2, \quad (2)$$

where L is the total tape length, t is the thickness of the tape and Ro is the hub radius. The term $Rs^2 + Rt^2$ has a peculiar value determined by the type of tape 20. It is thus possible to discriminate types of tapes of different values of hub radius Ro. Long-time tapes which exceed 120 minutes in recording time when used in SP mode have different thicknesses. The long-time tapes have reduced thicknesses for accommodation in the cassette, because tapes having different recording times are accommodated in cassette having a fixed size. The thickness of tape 20 is thus specified by specifying the type of tape 20. This specification is provided from tape kind discrimination signal generator 74.

The residual tape amount time T1 is represented by either one of the following two well-known equations:

$$T1 = \frac{\pi(Rs^2 - Ro^2)}{tv} \quad (3)$$

or, $$T1 = \frac{\pi}{tv} \left\{ \frac{\frac{L \cdot t}{\pi} + 2Ro^2}{1 + \left(\frac{Rt}{Rs}\right)^2} - Ro^2 \right\} \quad (4)$$

$$= \frac{\pi}{tv} \left\{ \frac{\frac{L \cdot t}{\pi} + 2Ro^2}{1 + \left(\frac{\omega s}{\omega t}\right)^2} - Ro^2 \right\},$$

where v is the tape speed at the time of the recording, and ω is the angular speed of reel. The residual tape amount time T1 can be calculated by using either one of equations (3) and (4). Of these equations, equation (4) permits calculation of the residual tape amount even if the extent of tape feed is not known provided the tape speed is constant. Thus, once the tape type is discriminated, it is possible to detect the tape position by causing the fast forward or reverse of tape without urging the tape against the capstan. Now, modifications of the above embodiment will be described. In the above embodiment, the residual amount of tape is calculated and displayed on display 78 while the tape is being fed in one direction (in the first forward reproduction or reverse reproduction mode). In addition to this method of calculation, the residual amount of tape may be calculated in both the fast forward reproduction and reverse reproduction modes, and the average value of the calculated values may be displayed as the residual amount of tape on display 78. In this case, the accuracy can be improved compared to the above embodiment.

Where the residual amount of tape is displayed in the average value, at the time of the end of the fast forward or reverse reproduction the result may be displayed, and at the time of the end of the calculation in the reverse or fast forward reproduction the average value of both the calculation results may be displayed. By so doing, it is possible to further reduce the time required from the start of the measurement till the display of the residual tape amount.

Further, in the case of the video tape recorder a television receiver is usually connected. Therefore, it is possible to display the residual tape amount along with other image on the receiver screen.

The residual tape amount data obtained in operational circuit 68 is supplied to character decoder 92, as shown in FIG. 3. Character decoder 92 converts the residual tape amount data into character data. The character data obtained from the residual tape amount data is supplied to subtitle device 94. To subtitle device 94 is supplied a video signal from a well-known video tape recorder. Subtitle device 94 comprises a character superimposition circuit to superimpose the display character data on the video signal input to the video tape recorder.

Further, an audio signal from the video tape recorder is supplied to RF modulator 96. RF modulator 96 receives an output signal from subtitle device 94 and supplies an RF signal to a television receiver. Subtitle device 94 supplies a video signal to the television receiver for the display of the image and residual tape amount data.

FIG. 4 shows an example of such television receiver. On screen 100 of television receiver 98 image from the video tape recorder is displayed by the video signal noted above. The residual tape amount is displayed by character display on a portion, e.g., a lower portion, of screen 100. In the Figure, subtitle 102 indicates that the residual tape amount corresponds to one hour and 20 minutes. If such television receiver 98 where the residual tape amount is displayed in the above manner is used such that the residual tape amount is displayed as subtitle 102 on screen 100 for a constant period of time, e.g., 3 seconds only at the time of the video tape recorder tape detection as noted above, it will be very convenient for the user. In such a video tape recorder, the tape position display can be obtained in a short period of time, e.g., 8 seconds, form the start of the tape loading.

It should be noted that the residual tape amount display method employed in each of the above embodiments is not necessarily connected with a tape cassette charging operation but may be started when a tape cassette is already charged and is in a stop condition.

What is claimed is:

1. A tape position detection apparatus having start control function, comprising:
    tape drive means for feeding a tape wound on reels in a first direction for forward or reverse feed;
    tape-returning means for feeding said tape in a second direction opposite to said first direction, such that said tape is returned to its initial position prior to said tape being fed in said first direction;
    detecting means, operatively coupled to said reels and said tape, for detecting data representing the amount said tape was fed in said first direction, the amount said tape was fed in said second direction, and the amount of rotation of said reels;
    start command generating means for outputting a start command to start an operation of detecting the position of said tape on the reels;
    controlling means, receiving said start command from said start command generating means, for controlling said tape drive means and said tape-returning means, the controlling means controlling said tape drive means after said start command is received such that said tape is driven in said first direction for a predetermined period of time, the controlling means automatically causing said tape-returning means to return said tape to said initial position after said tape drive means moved said tape from said initial position for said predetermined period of time;
    calculating means for calculating the used or residual amount of said tape utilizing said data detected by said detecting means; and
    display means for displaying the used or residual amount of the tape calculated by said calculating means.

2. An apparatus according to claim 1, wherein said tape drive means and tape-returning means are rendered operative in forward and reverse high speed reproduction modes.

3. An apparatus according to claim 2, wherein said predetermined period of time is of sufficient duration that each of said reels makes approximately one rotation or more.

4. An apparatus according to claim 3, wherein said calculating means calculates the position of said tape or the used or residual amount of said tape while said tape is being fed in said first direction.

5. An apparatus according to claim 4, wherein the result of calculation by said calculating means is converted into character data for superimposition on video data displayed on said display means.

6. An apparatus according to claim 3, wherein said calculating means calculates a first position of said tape or a first used or residual amount of said tape while said tape is being fed in said first direction, calculates a second position of said tape or a second used or residual amount of said tape while said tape is being fed in said second direction, and calculates the average value of the first and second positions or the first and second used or residual amounts of tape while said tape is being fed in said second direction.

7. A tape position detection apparatus for determining the position of said tape in a tape assembly, said tape assembly having a first reel and a second reel on which said tape is wound, said tape position detection apparatus having a start control function, comprising:
    first feeding means for feeding said tape in a first direction from the second reel to the first reel;
    first reel rotation detecting means and second reel rotation detecting means for detecting the rotation of said first reel and said second reel respectively, said first reel rotation detecting means generating pulses having a frequency corresponding to the rotational velocity of said first reel, said second reel rotation detecting means generating pulses having a frequency corresponding to the rotational velocity of said second reel;
    first reel rotation counting means and second reel rotation counting means for counting said pulses from said first reel rotation detecting means and second reel rotation detecting means respectively;
    first counting control means and second counting control means for setting a counting period for said first reel rotation counting means and said second reel rotation counting means respectively;
    memory means for temporarily storing the outputs of said first reel rotation counting means and said second reel rotation counting means generated during said counting period;
    a capstan for feeding said tape urged against it in reproducing and recording modes;
    capstan rotation detecting means for detecting the rotation of said capstan and for generating pulses having a frequency corresponding to the rotational velocity of said capstan;

capstan rotation counting means for counting said pulses generated by said capstan rotation detecting means;

calculating means for calculating said tape position or said used or residual amount of tape utilizing the output of said capstan rotation counting means;

display means for displaying the tape position or the used or residual amount calculated by said calculating means;

start command generating means for outputting a start command used to start an operation of detecting a tape position of said tape;

feeding control means for causing said first feeding means to start feeding said tape upon receiving said start command from said start command generating means, the feeding control means stopping said first feeding means after the lapse of said counting period;

second feeding means for feeding said tape in a second direction, opposite to said first direction;

comparing means, coupled to said first reel rotation counting means, said second reel rotation counting means, said memory means, and said control means, for comparing the outputs of said first reel rotation counting means and said second reel rotation counting means when said tape is being fed in said second direction with the contents of said memory means, the comparing means causing said feeding control means to stop the feeding of said tape in said second direction when the values being compared are substantially equal.

8. An apparatus according to claim 7, wherein said first and second feeding means are rendered operative in forward and reverse high speed reproduction modes.

9. An apparatus according to claim 8, wherein said predetermined period of time is a time period required for one rotation of said reels.

10. An apparatus according to claim 9, wherein said calculating means calculates the position of said tape or the used or residual amount of said tape while said tape is being fed in said first direction.

11. An apparatus according to claim 10, wherein the result of calculation by said calculating means is converted into character data for superimposition on video date displayed on said display means.

12. An apparatus according to claim 9, wherein said calculating means calculates a first position of said tape or a first used or residual amount of said tape while said tape is being fed in said first direction, calculates a second position of said tape or a second used or residual amount of said tape while said tape is being fed in said second direction, and calculates the average value of said first and second position or first or second used or residual amounts of tape while said tape is being fed in said second direction.

13. An apparatus for determining the amount of tape on a first reel and a second reel and for restoring the tape to its original position on the reels after the position determination is made, comprising:

first reel rotating means, coupled to the first reel, for rotating the first reel to wind the tape onto the first reel;

first reel rotation detecting means, coupled to the first reel, for detecting increments of rotation of the first reel and outputting a first reel output signal indicative thereof;

second reel rotating means, coupled to the second reel, for rotating the second reel to wind the tape onto the second reel;

second reel rotation detecting means, coupled to the second reel, for detecting increments of rotation of the second reel and outputting a second reel output signal indicative thereof;

tape movement detecting means for outputting a tape movement output signal indicative of the amount of travel of the tape between the first reel and the second reel; and processing means for:
controlling said first reel rotating means, monitoring said first reel output signal, and monitoring said second reel output signal such that both the first reel and the second reel rotate approximately once;

determining the amount of tape on the first reel and the amount of tape on the second reel based on information including the amount of rotation of the first reel as indicated by said first reel output signal, the amount of rotation of the second reel as indicated by said second reel output signal, and the amount of tape travel as indicated by said tape movement output signal; and controlling said second reel rotating means such that an amount of tape corresponding to said amount of tape travel as indicated by the tape movement output signal is rewound onto the second reel, the tape being restored to its original position.

14. The apparatus of claim 13 further comprising:
display means, coupled to said processing means, for indicating information indicative of the position of the tape relative to the position of the tape when the first reel is wound with all of the tape.

15. The apparatus of claim 14 further comprising:
a subtitle encoder for superimposing said information indicative of the position of the tape onto a first input picture signal to generate an output picture signal, the subtitle encoder receiving said information indicative of the position of the tape from said processing means, the subtitle encoder outputting the output picture signal to said display means;

wherein said display means comprises a television for generating a picture corresponding to said output picture signal.

16. The apparatus of claim 13 further comprising:
display means, coupled to said processing means, for indicating information indicative of the position of the tape relative to the position of the tape when the second reel is wound with all the tape.

17. The apparatus of claim 16 further comprising:
a subtitle encoder for superimposing said information indicative of the position of the tape onto a first input picture signal to generate an output picture signal, the subtitle encoder receiving said information indicative of the position of the tape from said processing means, the subtitle encoder outputting the output picture signal to said display means;

wherein said display means comprises a television for generating a picture corresponding to said output picture signal.

18. The apparatus of claim 13 wherein:
said processing means receives a tape type input signal indicative of the thickness and length of the tape wound on the first and second reels, said processing means uses the length of the tape and the thickness of the tape derived from the tape type input signal in determining the amount of tape on the first reel and the amount of tape on the second reel.

19. The apparatus of claim 13 wherein:
said processing means receives start position detection input signals indicating conditions upon which a position detection is to be initiated, said processing means initiates said position determination when one of the position detection input signals indicates one of said conditions.

20. The apparatus of claim 19 wherein:
one of said start position detection input signals is a tape loading detection input signal, the tape loading detection input signal being indicative of the loading of a new tape on new reels into the apparatus.

21. The apparatus of claim 19 further comprising:
a manual start detection button for outputting a manual start detection input signal indicative of whether the manual start detection button is depressed, said manual start tape detection input signal being one of said start position detection input signals to said processing means.

* * * * *